US008521620B2

(12) United States Patent
Livingston et al.

(10) Patent No.: US 8,521,620 B2
(45) Date of Patent: Aug. 27, 2013

(54) SYSTEMS AND METHODS FOR RFID SUPPLY CHAIN MANAGEMENT

(75) Inventors: Donald Livingston, East Dorset, VT (US); Jordan Lampert, Richmond Hill (CA)

(73) Assignee: Truecount Corporation, East Dorset, VT (US)

( * ) Notice: Subject to any disclaimer, the term of this patent is extended or adjusted under 35 U.S.C. 154(b) by 18 days.

(21) Appl. No.: 13/333,341

(22) Filed: Dec. 21, 2011

(65) Prior Publication Data

US 2012/0166241 A1 Jun. 28, 2012

Related U.S. Application Data

(60) Provisional application No. 61/426,045, filed on Dec. 22, 2010.

(51) Int. Cl.
*G06Q 10/00* (2012.01)

(52) U.S. Cl.
USPC .......................................................... 705/28

(58) Field of Classification Search
USPC .......................................................... 705/28
See application file for complete search history.

(56) References Cited

U.S. PATENT DOCUMENTS

| | | | | |
|---|---|---|---|---|
| 6,486,899 B1 * | 11/2002 | Bush, Jr. | ......................... | 715/855 |
| 6,989,749 B2 * | 1/2006 | Mohr | ......................... | 340/572.1 |
| 7,148,800 B2 * | 12/2006 | Cunningham et al. | ... | 340/539.11 |
| 7,698,179 B2 * | 4/2010 | Leung et al. | ..................... | 705/28 |
| 7,797,204 B2 * | 9/2010 | Balent | .............................. | 705/28 |
| 2005/0149414 A1 * | 7/2005 | Schrodt et al. | ................... | 705/29 |
| 2006/0232412 A1 * | 10/2006 | Tabacman et al. | ......... | 340/572.1 |
| 2009/0115573 A1 * | 5/2009 | Naressi et al. | ............... | 340/10.1 |
| 2010/0187306 A1 * | 7/2010 | Solomon | ....................... | 235/385 |
| 2010/0235250 A1 * | 9/2010 | Bar-Levav | ....................... | 705/23 |
| 2011/0251882 A1 * | 10/2011 | Richard | ..................... | 705/14.25 |
| 2011/0276396 A1 * | 11/2011 | Rathod | ...................... | 705/14.49 |

* cited by examiner

*Primary Examiner* — Mark A Fleischer
(74) *Attorney, Agent, or Firm* — John R. Thompson; Stoel Rives LLP (57) ABSTRACT

According to various embodiments, a supply chain management system may provide dynamic information regarding items in manufacturing, storage, inventory, or retail processes by detecting RFID tags embedded on the items. A supply chain management system may also be configured to determine current inventory and regulate what items are stocked and restocked on displays. A split-screen showing detected items and instructions or information pertaining to the items may facilitate accurate and efficient execution of process steps by an employee or user. Supply chain management systems may also provide for re-tagging items with lost or damaged RFID tags and finding items lost from inventory due to lost or damaged RFID tags. Furthermore, a supply chain management system may include RFID tags affixed to point of purchase displays and include information regarding the point of purchase display within a database.

49 Claims, 10 Drawing Sheets

BACK  Receive                                                      Welcome Steven   Sign Off Please Place RFID Tag in Zone | Shipping Info        7        1        4        1
                                                  Expected  Special  Present  Unexpected Expected Items                4/7                 Present Items

| Item | Style | Description      | Color | Size |
|------|-------|------------------|-------|------|
| 8965 | 8965  | Satin Bell Go ...| White | NA   |
| 9823 | 9823  | Bridal Satin ... | White | NA   |
| 2394 | 2394  | Short Dress ...  | Blue  | 3    |
| 7645 | 7645  | Pearl and Rhi ...| White | 2    |

| Item | Style | Description     | Color | Size |
|------|-------|-----------------|-------|------|
| 8763 | 9012  | Sapphire ...    | Blue  | 6    |
| 3245 | 8777  | Bridal Beige ...| Beige | 3    |
| 7823 | 2334  | Blue Dress ...  | Blue  | 4    |
| 0324 | 3344  | Rhinestone ...  | While | 2    |

Clear    Submit

TrueCount    Home    Manage    Receive

SYSTEMS AND METHODS FOR RFID SUPPLY CHAIN MANAGEMENT

RELATED APPLICATIONS

The present application claims the benefit under 35 U.S.C. §119(e) of U.S. Provisional Patent Application No. 61/426,045 filed Dec. 22, 2010 and titled "SYSTEMS AND METHODS FOR RFID SUPPLY CHAIN MANAGEMENT," which application is incorporated herein by reference in its entirety.

TECHNICAL FIELD

This disclosure generally relates to supply chain management, including manufacturing, shipping, retail sales, and supply chain management systems and processes. Specifically, the utilization of radio frequency identification (RFID) tags increases the accuracy, efficiency, and ability to manage various aspects of the supply chain.

BRIEF DESCRIPTION OF THE DRAWINGS

Non-limiting and non-exhaustive embodiments of the disclosure are described, including various embodiments of the disclosure with reference to the figures, in which.

In the following description, numerous specific details are provided for a thorough understanding of the various embodiments disclosed herein. The supply chain management systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

The present disclosure provides various embodiments of systems and methods utilizing radio frequency identification (RFID) tags in association with the production, shipping, inventories, and sales of goods, such as in retail stores. According to one embodiment, a unique RFID tag is affixed to each retail item. A database may associate detailed information regarding a retail item with the RFID tag affixed to that item. Thus, by scanning the RFID tag affixed to an item, information associated with that item (e.g. product and sales information) may be accessed. For example, an item with an affixed RFID tag may be associated within a database to item information, such as the total inventory of that item, purchase history, sale history, shipping, manufacturing, color, material type, fabric(s) used, size, quantity, variety, nutritional value, identities of people who have purchased the item, known location of the item, intended destination of the item, if the item has been stolen, and/or any other information that may be associated with an item being manufactured, offered for sale, and/or offered for rent or lease.

According to various embodiments, RFID tags, RFID readers, a database, and a screen may be used to display information related to the sale, manufacture, shipping, and/or other useful information related to a product. For example, according to some embodiments, items may be affixed with RFID tags and displayed in a sales display. A nearby RFID reader may then read the RFID tags of one or more of the items on display and update a dynamic display to show sales information, such as current price and/or available discounts. Accordingly, the supply chain management system may update dynamic displays by reading the RFID tags of items and retrieving associated sales information from a database. According to various embodiments, a dynamic display may include a liquid crystal display (LCD), a light-emitting diode (LED) backlit LCD display, plasma display, seven segment display, cathode ray tube display, plasma display, and/or the like.

According to various embodiments, a supply chain management system may include customer loyalty cards with embedded RFID tags allowing the supply chain management system to recognize the presence of a particular customer. Accordingly, the RFID reader may read the RFID tags of displayed goods, access sales information from a database, determine personalized pricing discounts based on a detected customer loyalty card, and display pertinent information on a dynamic display, such as a discount loyalty price. Additionally, a supply chain management system may be configured to identify an employee using an RFID tag embedded in clothing and/or an employee badge. Accordingly, the supply chain management system may identify a particular employee and display instructions, information, and/or responsibilities pertinent to the particular employee.

According to various embodiments, a supply chain management system may improve inventory accuracy using RFID tags and readers. According to one embodiment, a supply chain management system monitors restocking and provides accurate inventory information on demand. According to one embodiment, a display provides a split-screen view of expected items on one half of the display and which items are actually present on the other half of the display. Items intended for restocking may pass through a read-zone prior to being placed on display, in an assembly line, when managing products within the supply-chain, within a store, or within any other process. One side of a split-screen display may indicate which items are expected, or needed, for restocking. As items are presented to the read-zone, the supply chain management system may read the RFID tags of the items intended for restocking. The other side of the split-screen may display the items actually present in the read-zone. When all of the expected items have been restocked, the supply chain management system may indicate that the restocking task is complete.

Additionally, in order to prevent unwanted cross-reads, supply chain management systems may employ geographical mapping in order to ensure that RFID readers ignore RFID tags detected outside of a predetermined read-zone. According to various embodiments, a received signal strength indicator from an RFID tag, triangulation, and/or item trajectory may be used to prevent cross-reads. Accordingly, a read-zone may be established where RFID tags associated with retail items may be monitored. A detected RFID tag within the read-zone may trigger the appropriate response, such as updating inventory, sounding an alarm, validating that an item was received by a customer, etc. An RFID tag not within the read-zone, though within range of the RFID reader, may be ignored and thus not trigger a response.

According to another embodiment, a supply chain management system may be configured to monitor point of purchase (POP) displays. A POP display may be a display intended to promote purchases and/or advertise specials. A POP display may physically secure or support the item(s) being sold. Alternatively, the POP display may be an advertisement associated with available merchandise in another location. For example, a decorated stand, serving as a POP display, may be strategically located near cash registers and promote impulse purchases of items. As another example, a cardboard figurine, such as famous character or person, may stand alongside a product in order to promote the purchase thereof. An RFID tag may be associated with a particular POP display and/or the items associated with the POP display. For example, by scanning a POP display, a retailer may determine the type of POP display, the item(s) being sold in conjunction with the POP display, special promotions, inventory and/or location of inventory associated with the POP display.

Additionally, POP displays in a store may be read using an RFID reader in order to ensure that the correct POP displays are in use. The supply chain management system may be configured to compare the POP displays on the sales floor to a database indicating which POP displays should be on display, should be in storage, are outdated, etc. Accordingly, the supply chain management system may verify that outdated POP displays have been removed or provide notice to employees that a POP display should be removed. Moreover, the supply chain management system may verify that the POP displays do not remain unused in storage, but rather are displayed as intended and during the appropriate time interval.

Additionally, a supply chain management system may be configured to provide historical data regarding the location of items within a supply chain. For example, a database may indicate that a last scan indicated that item B was located between items A and C, or that item B was last scanned on shelf number 12. Accordingly, the supply chain management system may allow "lost items" to be located with relative ease. Additionally, items whose RFID tag is lost or damaged may receive a new RFID tag, and a database associating the item's old RFID tag to sales information may be updated to reference the new RFID tag.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, an "embodiment" may be a supply chain management system, a method, or a product of a process.

The phrases "connected to" and "in communication with" refer to any form of interaction between two or more components, including mechanical, electrical, magnetic, and electromagnetic interaction. Two components may be connected to each other, even though they are not in direct contact with each other, and even though there may be intermediary devices between the two components.

RFID tags may include passive RFID tags, which have no power source and may require an external stimulus, such as an electromagnetic field, to initiate a signal transmission. Alternatively, RFID tags may be active RFID tags, which are independently powered, such as by light or a battery. Active RFID tags may continually transmit a signal, or transmit signals once a receiver has been successfully identified. Additionally, RFID tags may be battery assisted passive (BAP) RFID tags, which may require an external source, such as light or an electromagnetic field, to wake up. BAP RFID tags may be capable of transmitting further than passive RFID tags.

While the present disclosure primarily refers to RFID technology, a skilled artisan will recognize that other remote sensing technologies may be used, such as LWID (Long Wavelength ID), also known as RuBee or IEEE 1902.1, VLID (Visible Light ID), Skinplex (available from Ident Technology AG), Microfiber Sensor Tracking (available from Demodulation, Inc.), near field communication (NFC), Bluetooth wireless technologies, etc.

Accordingly, the supply chain management systems and methods described herein may use electronic identification devices (EIDs) of varying types. For example, an EID may comprise an RFID tag, an LWID tag, an identification device in a Skinplex, and/or a device on a Microfiber Sensor Tracking system. In some embodiments an EID may comprise programmable electronic components allowing the EID to be reprogrammed. For example, an EID may be reprogrammed to communicate new identification information each time the EID is associated with a new item in a manufacturing, processing, or retail supply chain. Accordingly, in some embodiments, an EID may include a memory, a microcontroller, and/or other programmable electronic components. Alternatively, the EID may be pre-programmed during manufacturing, such as may be the case with an RFID tag.

The remainder of this disclosure will refer more particularly to embodiments utilizing RFID, recognizing that other technologies may be used within the scope of the disclosure. However, it should be understood that any of a wide variety of EIDs may be used in place of an RFID tag. In such embodiments, a corresponding remote sensor would be used in place of an RFID reader.

In the embodiments depicted in the drawings, the size, shape, orientation, placement, configuration, and/or other characteristics of RFID tags and RFID readers are merely illustrative. Specifically, EIDs, such including RFID tags, are commonly manufactured very small and may not be necessarily as obtrusive as depicted in the drawings. Additionally, RFID readers, or other remote sensors, may be any shape and/or size and be portable, handheld, and/or stationary, and are not limited by the exemplary illustrations. Moreover, the RFID readers, which may be significantly smaller than illustrated, may be less intrusively placed and/or configured than those depicted in the drawings.

Furthermore, while reference is often made to retail stores and items for sale, various aspects of the present disclosure may be applied or modified for application to manufacturing, shipping, storing, leasing, asset management and/or selling of goods and products.

According to various embodiments, a supply chain management system is configured to monitor and manage the presence and/or location of customers, employees, attendees, and/or other people. For example, a supply chain management system may be utilized to manage and automate systems and processes in which large groups of attendees are present. For example, theme parks, cruise ships, and/or ski resorts may utilize RFID tags carried by an attendee to automate the attendance process. Furthermore, monitoring and management of employees, attendees, customers, and/or other people involved with a process may allow a supply chain management system to efficiently manage various other aspects of workflow, employee assignments, and/or assent management.

The supply chain management systems described may be utilized in conjunction with any item for sale, resale, lease, rent, in storage, used in a manufacturing process, inventoried, and/or otherwise displayed or used in a process. An RFID tag may be affixed to any physical object for use in any combination of the supply chain management systems described herein. For example, manufacturing, shipping, storage, and retail sales of clothing and other apparel are contemplated.

Some of the infrastructure that can be used with embodiments disclosed herein is already available, such as: general-purpose computers, RFID tags, RFID readers, computer programming tools and techniques, digital storage media, and communications networks. A computer may include a processor such as a microprocessor, microcontroller, logic circuitry, or the like. The processor may include a special purpose processing device such as an ASIC, PAL, PLA, PLD, Field Programmable Gate Array, or other customized or programmable device. The computer may also include a computer-readable storage device such as non-volatile memory, static RAM, dynamic RAM, ROM, CD-ROM, disk, tape, magnetic, optical, flash memory, or other computer-readable storage medium.

Aspects of certain embodiments described herein may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the supply chain management systems and methods of the disclosure is not intended to limit the scope of the disclosure, as claimed, but is merely representative of possible embodiments. In other instances, well-known structures, materials, or operations are not shown or described in detail to avoid obscuring aspects of this disclosure. In addition, the steps of a method do not necessarily need to be executed in any specific order, or even sequentially, nor need the steps be executed only once, unless otherwise specified.

Figure 1:
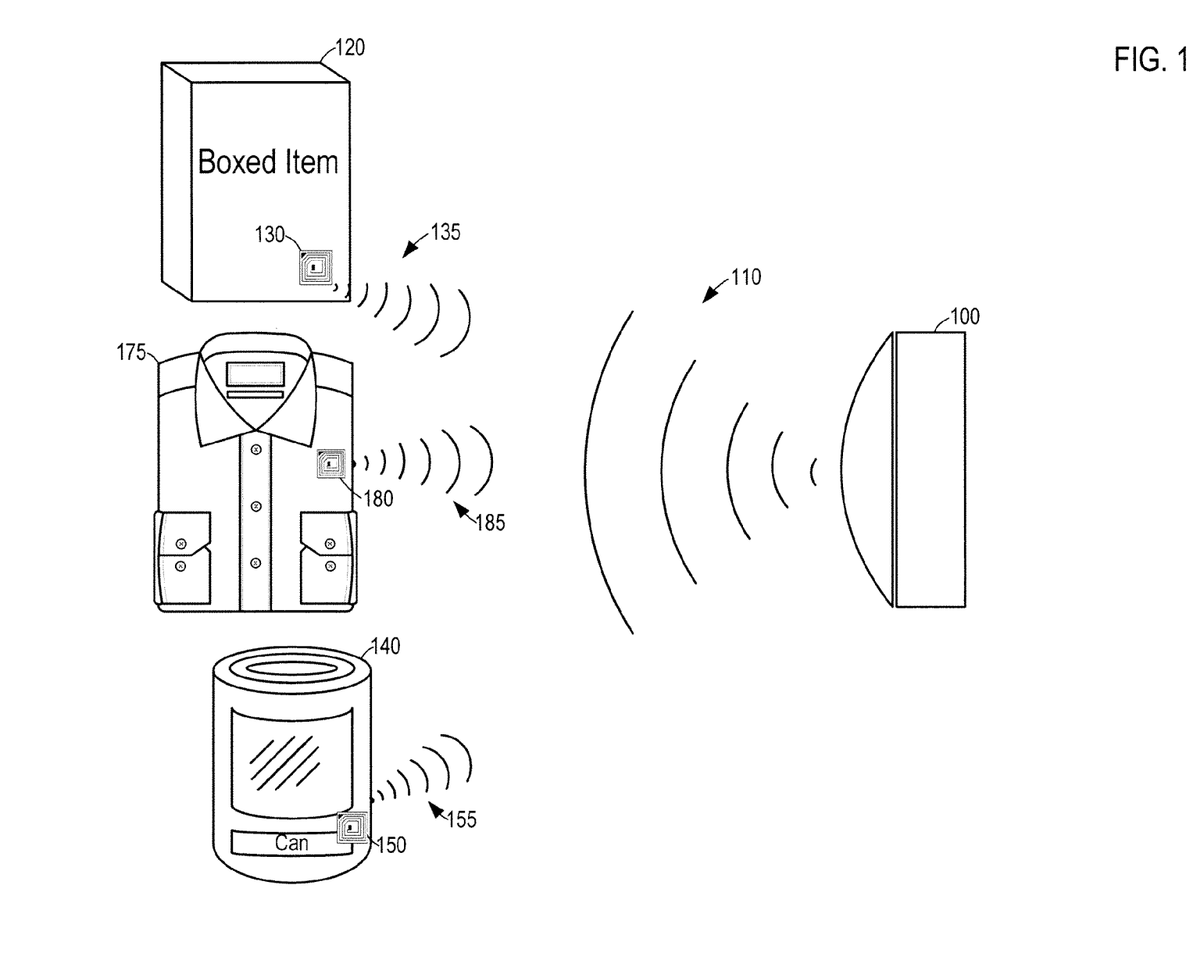
FIG. 1 illustrates various items with affixed RFID tags and an RFID reader, according to one exemplary embodiment.

FIG. 1 illustrates a supply chain management system including boxed item 120 with an affixed RFID tag 130, can 140 with an affixed RFID tag 150, shirt 175 with an affixed RFID tag 180, and an RFID reader 100. According to various embodiments, RFID tags 130, 150, and 180 may be affixed to items 130, 140, and 175 as they are moved through a supply chain, such as during manufacturing, bulk sales, resale, rent, lease, and/or storage of the items. Each RFID tag 130, 150, and 180 may be assigned a unique identifier and is associated with the item to which it is affixed. A supply chain management system may associate each RFID tag 130, 150, and 180 with sales information corresponding to the item 130, 140, and 175 to which the RFID tag 130, 150, and 180 is affixed. For example, a supply chain management system may include a database configured to associate RFID tag 130 with sales information corresponding to boxed item 120. Similarly, the database may be configured to associate RFID tag 180 with sales information corresponding to shirt 175. The supply chain management system may facilitate the monitoring and tracking of items in any of a variety of business and manufacturing processes, including shipping, storage, inventory, and retail sales. Additionally, according to various embodiments, local supply chain management systems may be managed by a central management system.

According to various embodiments, sales information may include any characteristic related to the current state or history of the item. For example, the database may simply associate an RFID tag with a price. Alternatively, the database may associate an RFID tag with product information, a price, loyalty customer price, and a shipping date. More complex systems may include any number of data relating to the item, such as total inventory of that item, related items, purchase history, sale history, shipping, manufacturing, color, size, quantity, type, nutritional value, identities of people who have purchased the item, expected date of next shipment, etc.

Additionally, a supply chain management system may identify misplaced items and provide notifications or instructions to return the item to its proper location. For example, the supply chain management system may identify clothing that is no longer in season (e.g., shorts in the winter) and provide instructions to an employee to remove the shorts from the sales floor. Another example includes notifying employees and providing instructions regarding the removal and placement of promotional items during specific time intervals.

As previously described, any type of EID and associated remote sensor may be used. The present embodiment describes a supply chain management system utilizing RFID tags and RFID readers. In the present embodiment, RFID tags 130, 150, and 180 may be passive, active, or battery assisted passive RIFD tags. For clarity, the remainder of the disclosure assumes passive RFID tags are utilized in conjunction with an active RFID reader configured to elicit a response from the passive RFID tags. Accordingly, RFID reader 100 may be configured to emit an interrogation signal 110, such as an electromagnetic signal, to activate and elicit response electromagnetic signals 135, 155, and 185 from RFID tags 130, 150, and 180. RFID reader 100 may receive response electromagnetic signals 135, 155, and 185. The supply chain management system may use the response electromagnetic signals 135, 155, and 185 to determine sales information associated with items 120, 140, and 175 that is stored within the database.

Figure 2A:
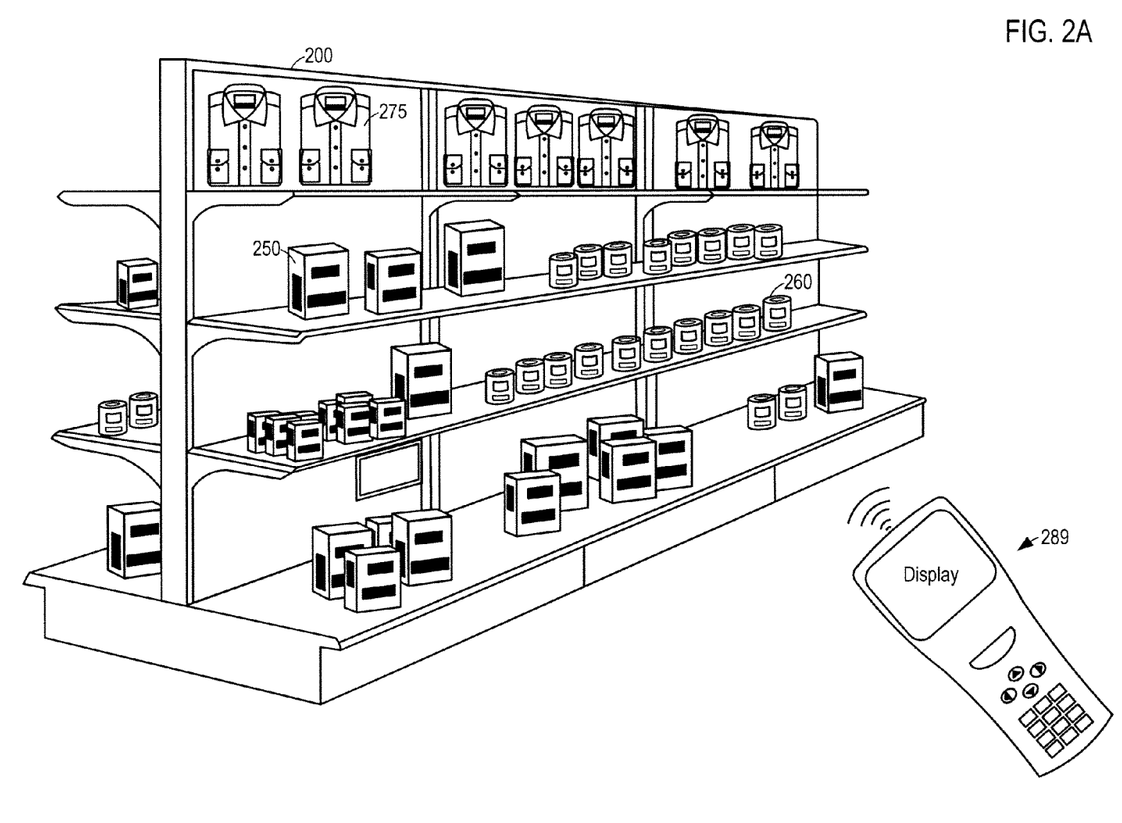
FIG. 2A illustrates various items with affixed RFID tags, in storage or in a manufacturing process, and a portable RFID reader with an integrated digital display, according to various exemplary embodiments.

FIG. 2A illustrates shelving 200 configured to display various items 250, 260, and 275 in storage, in a manufacturing process, for sale, for resale, and/or for rent. According to various embodiments, any type of display, including shelving, may be used to display any type of product during storage or while it is for sale, resale, and/or rent. For example, items 250, 260, and 275 may be in a manufacturing facility, storage unit or warehouse, shipping vehicles, or retail shelving. The supply chain management system may be utilized in conjunction with a wide variety of systems and processes independent of or in addition to the illustrated shelving 200. According to the illustrated embodiment, items 250 and 260 may each be affixed with an RFID tag (not illustrated). A portable RFID reader 289 may provide information regarding a scanned item to a user, employee, or customer. Information provided may depend on the person using the reader, a user's request, and/or the type of process being implemented. For example, information displayed to a manufacturer may be different from the information displayed to a consumer or retail employee.

Figure 2B:
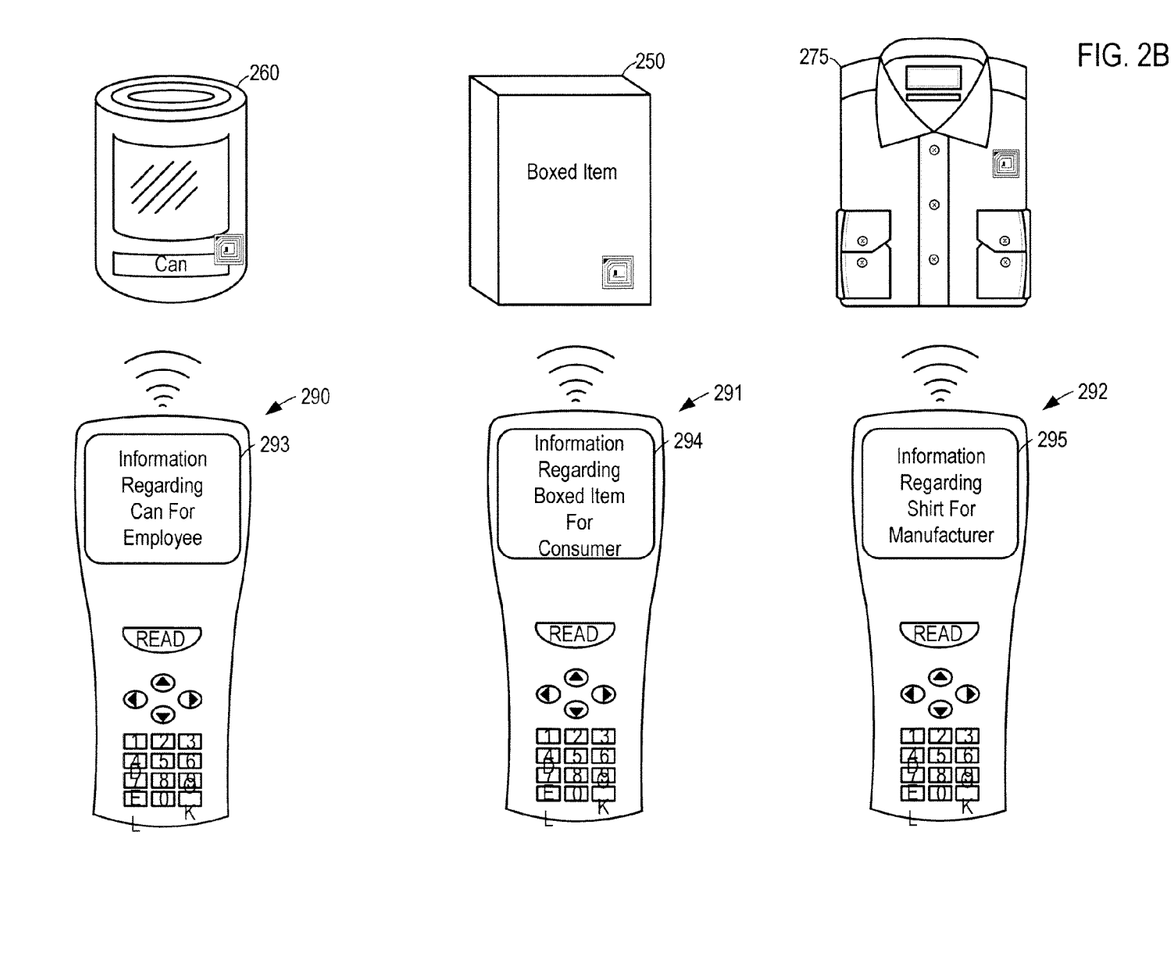
FIG. 2B illustrates portable RFID readers with integrated digital displays configured to display information regarding items in one or more aspects of a supply chain, according to various exemplary embodiments.

FIG. 2B illustrates portable RFID readers 290-292, including digital displays 293-295, which may be configured to display information regarding items 250, 260, and 275. Digital displays 293-295 may be liquid crystal displays (LCDs), light emitting diode (LED) displays, LED backlit LCD displays, plasma displays, seven segment displays, and the like. According to alternative embodiments, independent portable or fixed digital displays are in communication with portable or fixed RFID readers configured to read the RFID tags of nearby items. A database associating each of the RFID tags with product and sales information may be queried, and pertinent information related to items 250, 260, and 275 may be displayed on digital displays 293-295. As illustrated, displayed information may be pertinent to any of the various users involved in an item from inception during manufacturing to an end user customer.

For example, digital displays 293-295 may display the price of items 250, 260, and 275, available discounts, current promotions, and/or price per unit. Any of a wide variety of additional types of information may also be presented pertinent to employees, manufacturers, shipping employees, restocking systems, etc. For example, the size of clothing may be presented, return policies, financing options, etc. Digital displays 293-295 allow user input through buttons, wheels, touch screens, or other input. Accordingly, users may select what type of information they would like to see, or provide feedback.

A supply chain management system may further include RFID tags embedded in customer loyalty cards. As a loyalty customer approaches a display, an RFID reader may detect the presence of the loyalty customer and dynamically adjust the prices and/or other information displayed. Moreover, prices might be dynamically adjusted based on sales inventory, expected shipments, market value, customer, quantity purchased, and/or other factors.

A supply chain management system may further detect RFID tags worn or carried by employees and display information useful for the employee. For example, digital displays 293-295 may display information regarding work assignments, tasks, suggestive selling tools, and/or other things pertinent to the employee's duties.

Figure 3A:
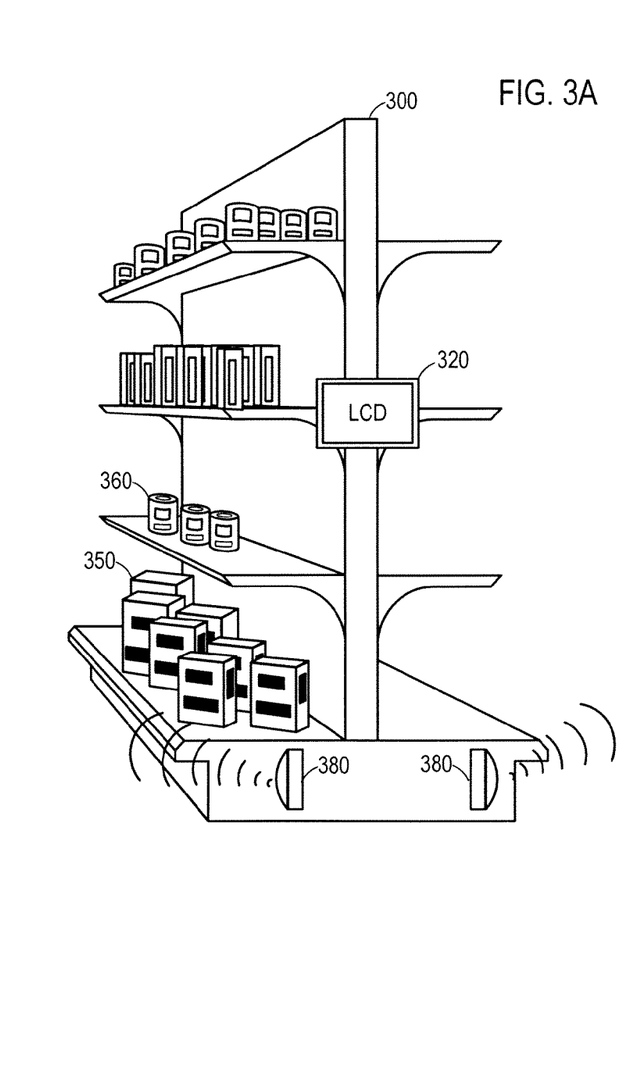
FIG. 3A illustrates items with affixed RFID tags stored on shelving configured with integrated digital displays and RFID readers, according to various exemplary embodiments.

FIG. 3A illustrates exemplary shelving 300. As illustrated, each row of shelving 300 includes an LCD 320 and RFID readers 380. According to various embodiments, RFID tags may be affixed to each of items 350 and 360 located on shelving 300. RFID readers 380, additional RFID readers located strategically on shelving 300, and/or portable RFID readers (as in FIG. 3B) may be included in a supply chain management system and configured to identify the RFID tags affixed to each item on shelving 300. Accordingly, an accurate inventory of available items may be maintained and/or system processes may be efficiently executed. A supply chain management system may include a database configured to associate each RFID tag with various data and information, as previously described in conjunction with FIGS. 1 and 2.

RFID readers 380 may be configured to detect when one of items 350 or 360 are removed from the aisle. The supply chain management system may then be configured to provide information regarding what is needed for restocking purposes. According to various embodiments, the supply chain management system may be aware of what is in stock, such as in a backroom, and what needs to be ordered. Accordingly, the supply chain management system may alert users as to what is needed for restocking, order the necessary items, and/or provide accurate inventory counts.

Additionally, the supply chain management system may be configured to provide conversion metrics. For example, RFID readers 380 may be configured to detect when an item is removed from a shelf and put back. As an example, conversion metrics may include the number of times an item is picked up and returned to the shelf compared to the number of times it is picked up and subsequently purchased. Moreover, such conversion metrics may also compare the effectiveness of items on standard shelves or racks as compared to POP displays. According to various embodiments, this may allow a supply chain management system to determine which items, advertisements, and/or sales tactics appeal to consumers.

According to one embodiment, LCDs 320 may selectively display restocking information for employees. For example, LCDs 320 may display what items need to be restocked. According to various embodiments, RFID readers 380 may detect the presence of an employee using an RFID tag located on the employee, and only when an employee is present will restocking information be displayed. At other times, pertinent advertising and/or sales information may be displayed to potential customers.

According to various embodiments, as items are brought for restocking, RFID readers 380 may determine if the correct items for restocking are present, which items needed for restocking are not present, and/or which items are unexpected and should not be stocked on a given aisle. According to various embodiments, RFID readers 380 may be configured to read RFID tags only within a specific geographic region, known as a read-zone.

Figure 3B:
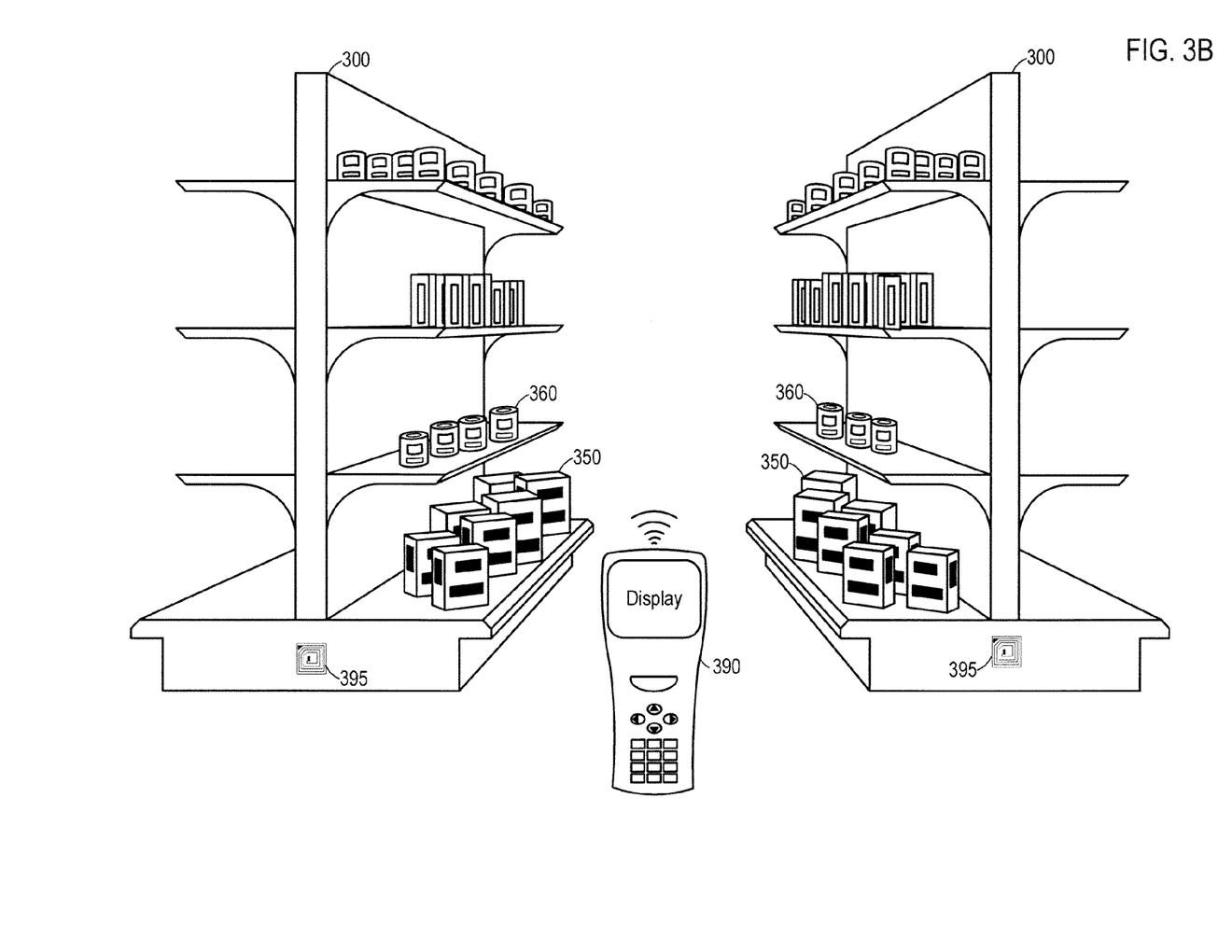
FIG. 3B illustrates exemplary shelving, items with affixed RFID tags, and a portable RFID reader with an integrated digital display, according to one exemplary embodiment.

FIG. 3B illustrates shelving 300 and items 350 and 360, similar to the description associated with FIG. 3A. In addition, a portable RFID reader 390 with an integrated digital display may be used to perform at least the same functions as described in conjunction with digital displays 320 and RFID readers 380 of FIG. 3A. According to various embodiments, portable RFID reader 390 may provide increased mobility and efficiency to employees engaged in manufacturing, shipping, inventory, storage, and retail processes. Additionally, consumers, manufacturers, and other users may utilize portable RFID reader 390 to efficiently perform tasks, such as purchase an item, identify an item, and/or further the manufacturing, shipping, or retail process. According to various alternative embodiments, digital displays 320 of FIG. 3A are used in conjunction with portable RFID reader 390, which may or may not also include an integrated digital display. Additionally, each shelf or isle, such as shelving 300, may include a unique RFID tag 395, allowing the supply chain management system to associate items 350 and 360 with a particular shelf or set of shelves.

According to various embodiments, cross-reads, defined as an RFID reader receiving the RFID tags of items outside of an intended read-zone, are minimized or eliminated by detecting a change in a received signal strength indicator (RSSI). Additionally or alternatively, triangulation or partial triangulation using two reference points may be used. Moreover, trajectory, velocity, changes in trajectory, and/or other geographical constants may be used to ensure that RFID tags outside of an intended read-zone are not cross-read.

Particularly, an employee using a supply chain management system may set an RFID reader to scan the RFID tags of a group of items in order to perform certain actions, such as scan to location, cycle count, scan to inventory, search for a particular item, etc. Sometimes it may be intended to exclude certain items that are otherwise in range of the RFID reader. Intelligent RFID readers in a supply chain management system may be configured to prevent undesired cross-reads. Thus, read-zones may be established wherein RFID tags are read, and no-read-zones may be established wherein RFID tags are not read, even though they may be in range. Moreover, intelligent RFID readers may identify and/or report when a user is scanning an unexpected item, an item has been cross-read, and/or if the supply chain management system is unable to prevent cross-reads.

Figure 4:
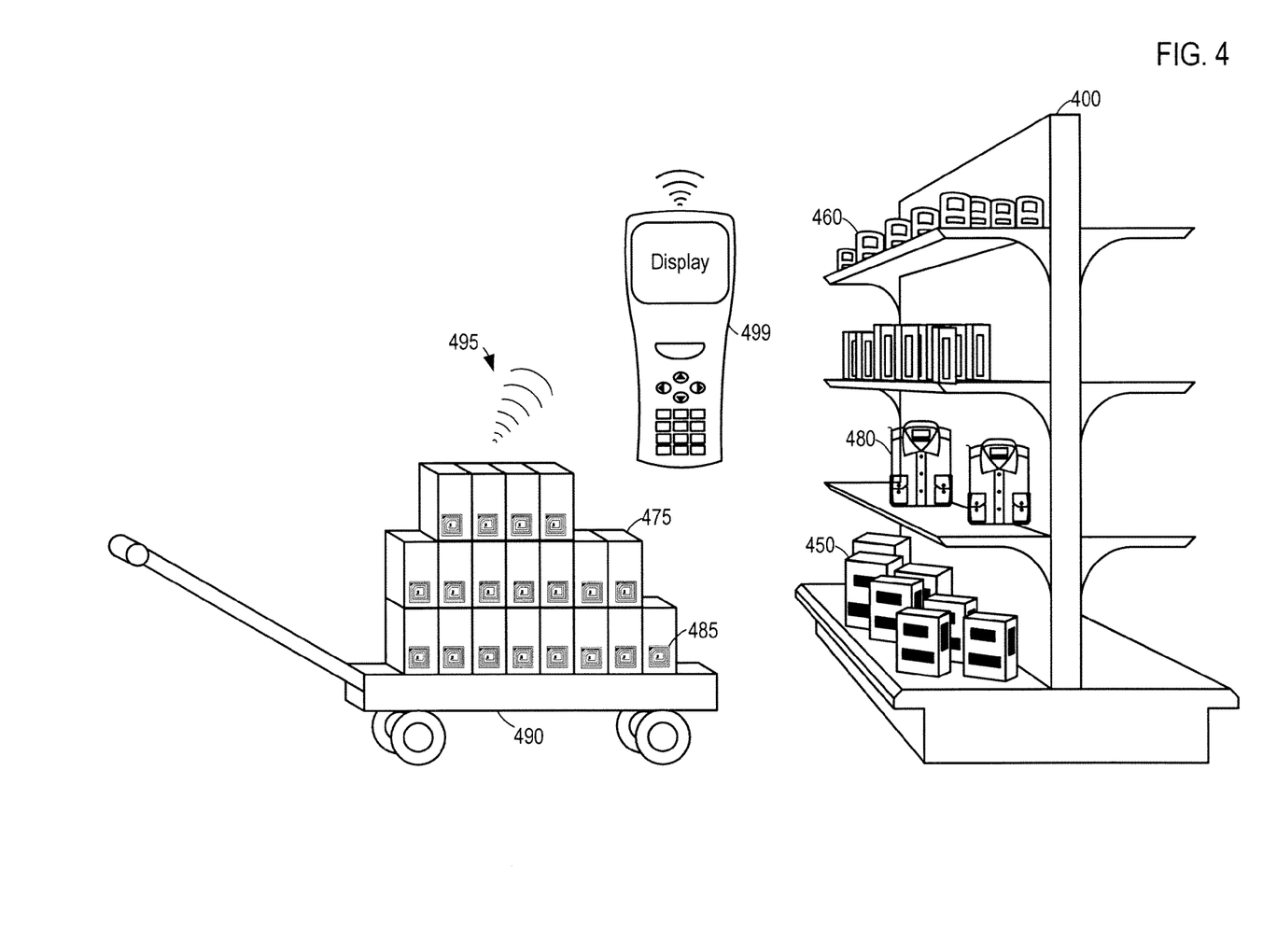
FIG. 4 illustrates a portable RFID reader with an integrated digital display and items to be stocked on shelving, according to one exemplary embodiment.

FIG. 4 illustrates shelving 400 and various items 450, 460, and 480 in a process, such as manufacturing, shipping, storage, or retail sales and/or rent. As illustrated, a restocking cart 490 may be brought to restock shelving 400 with various items 475. A portable RFID reader 499 with an integrated digital display may be configured to read unique RFID tags 485 affixed to each item 475. As illustrated, portable RFID reader 499 may emit an interrogation signal configured to elicit a response signal 495 from each of the RFID tags 485 affixed to each of the items 475 on restocking cart 490. Accordingly, a supply chain management system may record which items are being used to restock shelving 400.

Furthermore, portable RFID reader 499 may display whether or not items 475 on restocking cart 490 are needed, how many of them are needed, and/or other restocking information. According to various embodiments, portable RFID reader 499 may display what items are expected for restocking and what items are actually present on restocking cart 490. This may allow an employee to confirm that the correct items are being stocked and/or correct any errors in what is being stocked. Additionally, a supply chain management system may include additional RFID readers or utilize portable RFID reader 499 to record which employee(s) stocked, restocked, removed, and/or otherwise tampered with items on restocking cart 490 and/or shelving 400. According to one embodiment, restocking cart 490 and/or shelving 400 may also be fitted with an RFID reader and/or an LCD.

Figure 5:
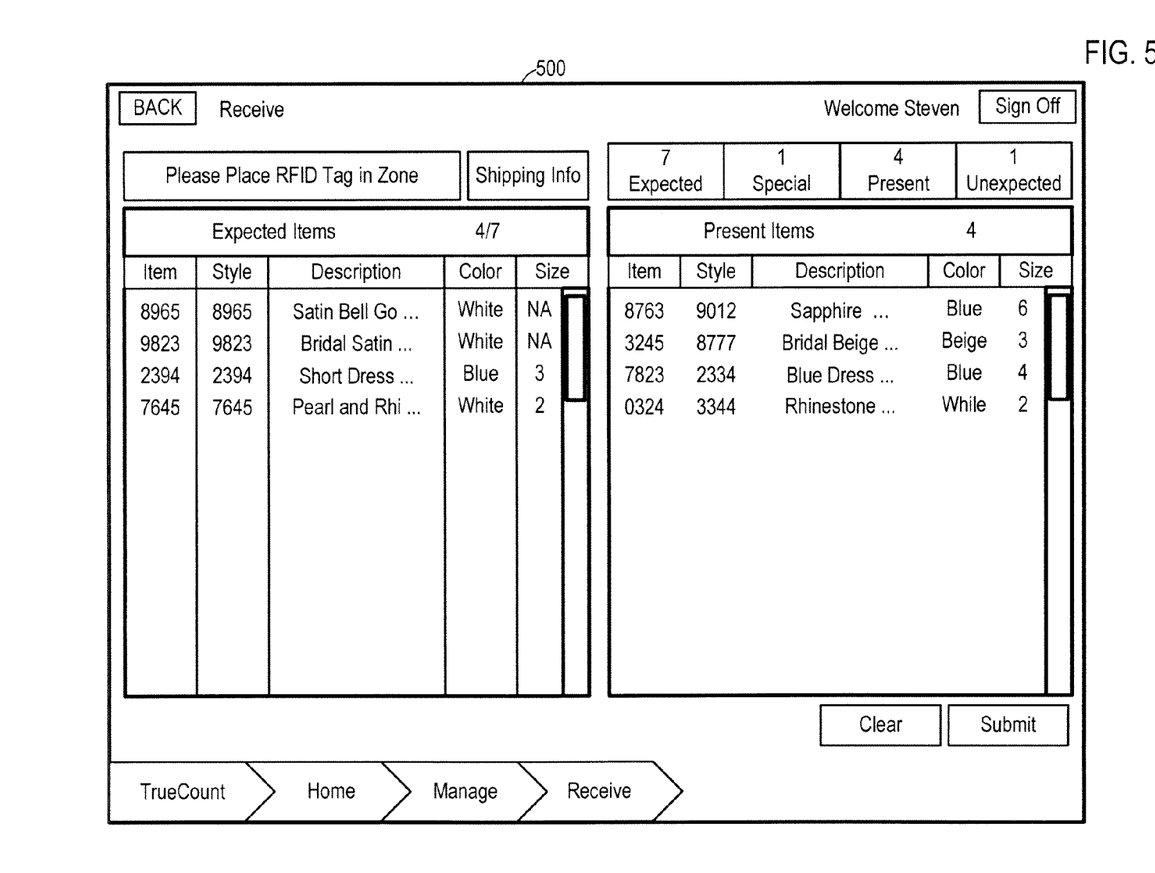
FIG. 5 is an exemplary screen shot of a supply chain management system facilitating the execution of a manufacturing, shipping, storage, inventory, and/or retail process, according to one exemplary embodiment.

FIG. 5 illustrates an exemplary screen shot 500 of what an employee may see on a digital display, such as an integrated digital display on a portable RFID reader, during a restocking, inventory, storage, shipping, manufacturing, or other process. As illustrated, a split-screen display may be configured to show what items are expected on the left and what items are actually present on the right. Included in the screen-shot are various menu and input buttons an employee may have access to during the execution of a process. As illustrated, various tabs, windows, and/or buttons may provide an employee with all the information needed for accurate restocking, shipping, storage, inventory, and/or manufacturing. That is, in addition to displaying what is present and what is expected, the split-screen display may also provide instructions and/or identify tasks an employee should perform in relation to present or expected items. Additionally, the supply chain management system may record which employee performed the tasks, restocked the shelves, inventoried the items, and/or performed other processes by detecting an RFID tag worn or carried by the employee.

According to various embodiments, a split-screen system may simultaneously display detected or present items and handling instructions, such as specific tasks an employee should perform with regards to the detected items in furtherance of a manufacturing, storage, inventory, and/or retail process. Additionally, the supply chain management system may monitor the performance and efficiency of both employees and the items. For example, a supply chain management system may inform an employee that an item has been brought to an incorrect location and provide instructions regarding what steps the employee should take to correct the error.

The supply chain management system may also be configured to provide efficiency metrics regarding various persons. For example, the supply chain management system may identify a person (employee, user, or customer) using an RFID tag worn or carried by the person, record their identity, and the time it takes for them to accomplish a certain function. For example, the supply chain management system may record an employee's efficiency and ability to correctly restock shelves.

The present split-screen display may be integrated into any business, manufacturing, or retail process. By displaying identified items in conjunction with instructions regarding the identified items, employees and users may be able to more efficiently perform their role in any of a variety of processes. RFID based processes may facilitate inventory and efficient execution of tasks throughout any of a variety of business and/or manufacturing processes from inception of an item and/or asset to its delivery at a final destination.

A complete stocking and restocking cycle described in conjunction with FIG. 4 and FIG. 5 may begin with a supply chain management system aware of items currently stocked on shelves 400. The supply chain management system may utilize portable RFID reader 499 to detect which items 450, 480, and 460 (each with an affixed RFID tag) are missing from shelves 400 and therefore need restocking. The supply chain management system may provide an alert as to which items need restocking and on which shelves at a specific time during the day, continually, at regular intervals, in response to specific triggering events, when new items are received and/or when the correct employees are present. A display of an RFID reader, such as portable RFID reader 499 or different RFID reader (not illustrated), may display the expected items on the left side of a split screen to facilitate restocking. An employee may then utilize portable RFID reader 499 or an RFID reader in a shipping vehicle or stockroom to collect the necessary items 475 for restocking. The employee may then place the items for restocking on a restocking cart 490.

As restocking cart 490 is brought to shelving 400, RFID reader 499 may read RFID tags 485 of items 475 brought for restocking. Items 475 present on restocking cart 490 may be displayed on the right side of a display, alerting the employee to any mistakes or incorrect items. As items 475 are restocked, they may pass through a read-zone of an RFID reader (possibly portable RFID reader 499) as they are placed on shelving 400. The supply chain management system may update the inventory so as to accurately display what items are available and on which aisle or shelving 400 they are located.

According to various embodiments, a supply chain management system may be aware of backroom stock and the inventory in each area of a store and may request that items be removed from one aisle or shelving to another. Moreover, supply chain management systems may also contain information regarding shipping, delays, potential shortages, etc. and adjust the inventory levels and pricing in various locations accordingly. Moreover, supply chain management systems may also apprise employees of expiration dates.

Figure 6:
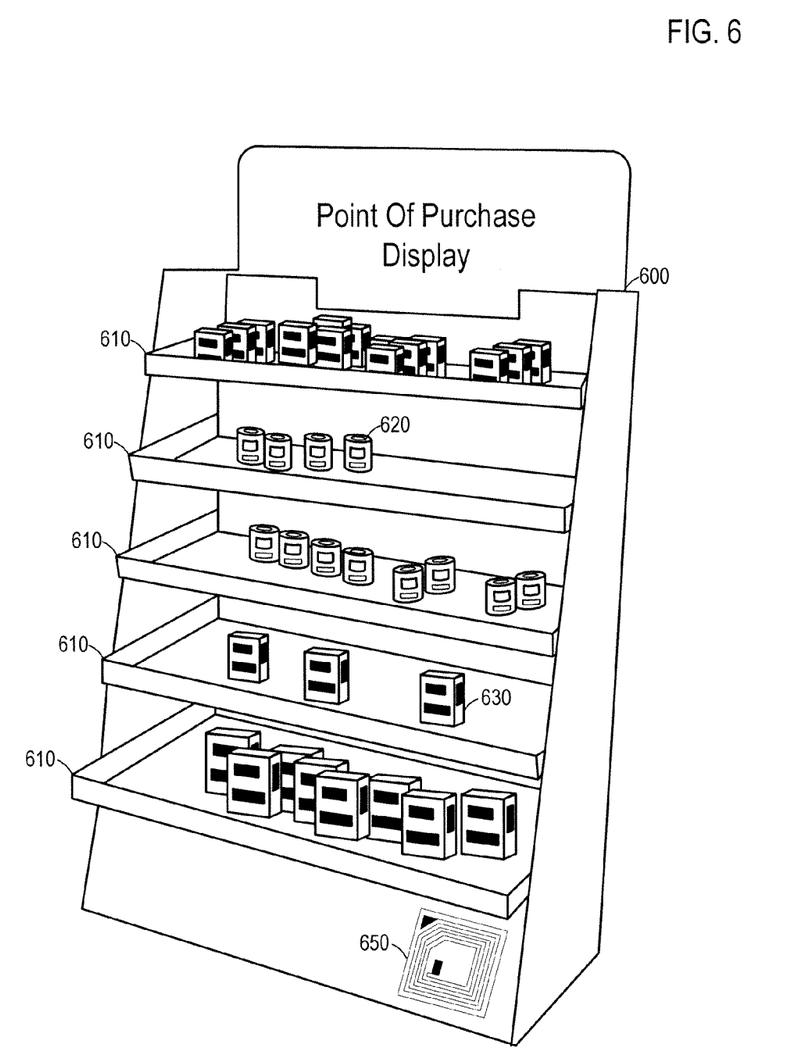
FIG. 6 illustrates a point of purchase (POP) display for displaying various items and an RFID tag associated with the POP, according to one exemplary embodiment.

FIG. 6 illustrates a point of purchase (POP) display 600 configured with an RFID tag 650. POP 600 may be configured to secure and/or promote various items 620 and 630 for sale, resale, and/or rent. According to the illustrated embodiment, POP display 600 includes shelves 610 supporting items 620 and 630. RFID tag 650 may allow an RFID reader to determine information regarding the POP display 600 and/or the items 620 and 630 associated with POP display 600. For example, an RFID reader may read the RFID tag 650 of the POP display 600 and determine that the items 620 and 630 are out of stock. Therefore the POP display 600 may be removed from display. Later, an RFID reader may be used to read the RFID tags 650 of various POP displays 600 to determine which of them should be put on display in the store based on available stock, season, current promotion, or other event.

According to various embodiments, a POP display 600 may comprise one or more mannequins and the items on display may comprise clothing and other apparel worn or displayed by a mannequin. A supply chain management system may be configured to indicate which types of clothing and/or apparel should be displayed on the mannequin depending on season, promotion, availability, and/or other manually input instructions.

According to various embodiments, by affixing an RFID tag 650 to POP display 600, an accurate inventory of available POP displays and associated items may be maintained. Maintaining an accurate inventory POP displays may prevent or reduce theft, allow for appropriate stocking of items, timely placement and removal, and/or management of the purchasing of additional POP displays. A database associated with a supply chain management system may associate the RFID tag 650 of POP display 600 with the type of POP display, items 620 and 630 on pop display 600, promotions, promotional items, timeframes of the promotions, and/or discount or special prices for items 620 and 630. The supply chain management system may provide alerts to employees for restocking, theft, or availability, if POP display 600 should be used on the sales floor or is taken off, and/or if an out-of-stock item has been received. Additionally, the supply chain management system may monitor the inventory levels of POP display 600, as described in conjunction with FIG. 4 and FIG. 5.

Each POP display 600 in a store may be read using an RFID reader in order to ensure that each POP display 600 is either correctly stored or correctly used on a sales floor during the appropriate time interval. The supply chain management system may be configured to compare the POP displays in use to a database indicating which POP displays should be in use on the sales floor, should be in storage, are outdated, etc. Accordingly, the supply chain management system may verify that outdated POP displays are promptly removed, new POP displays are put to use, and/or that items associated with a POP display are present and in stock during the appropriate time intervals.

Figure 7:
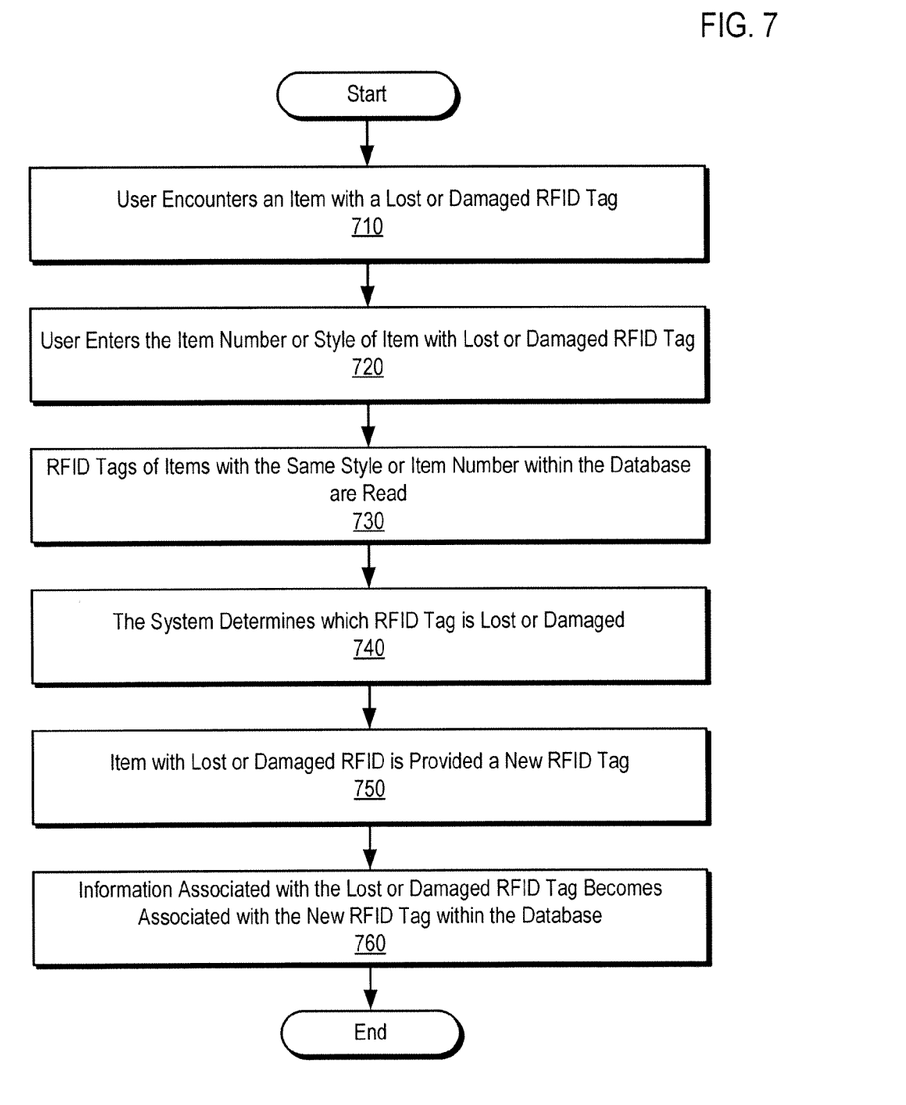
FIG. 7 illustrates a flow chart of an exemplary method for identifying an item with a lost or damaged RFID tag and replacing the RFID tag.

FIG. 7 illustrates an exemplary method for replacing an RFID tag on an item with a lost or damaged RFID tag. The method assumes a supply chain management system in which items are affixed with RFID tags, and a database associating product and sales information with each RFID tag. Accordingly, a user may encounter an item with a lost or damaged RFID tag, at 710. A user may enter information about the item, e.g., name, description, barcodes, etc., into the supply chain management system sufficient for the supply chain management system to determine what type of product it is, at 720. RFID tags of items with the same item numbers may then be scanned and read by an RFID reader, at 730. If the RFID tags of all of that type of item are read, the supply chain management system may deduce which item is not represented, and thereby identify the item with the lost or damaged RFID tag, at 740. The item may then be provided a new RFID tag, at 750. Information associated with the lost or damaged RFID tag is updated in the database so as to associate it with the new RFID tag, at 760.

Figure 8A:
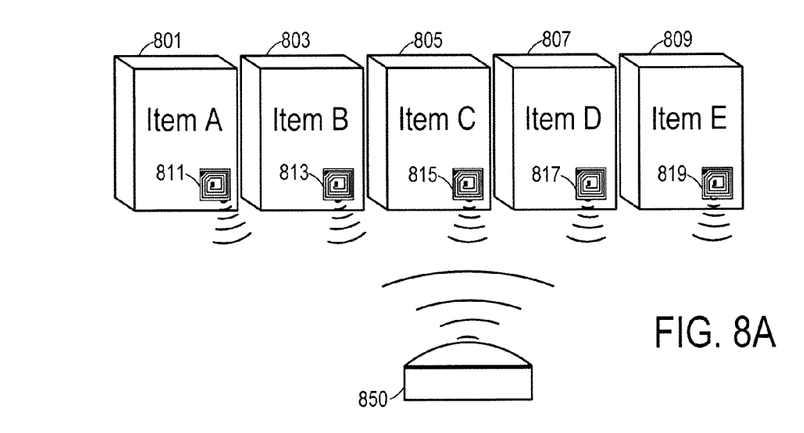
FIG. 8A illustrates items A-E with affixed RFID tags, and an RFID reader, according to various exemplary embodiments.
Figure 8B:
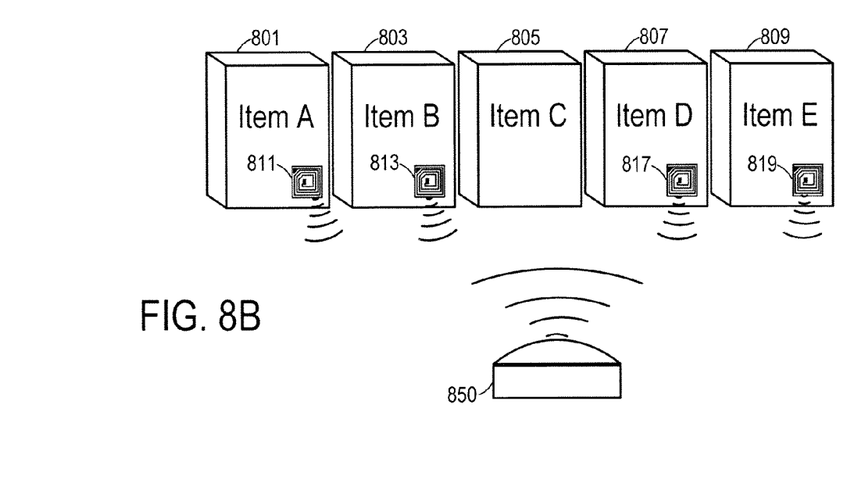
FIG. 8B illustrates items A-E with the RFID tag associated with item C missing, according to various exemplary embodiments.

FIG. 8A and FIG. 8B illustrate a method for finding an item that is "lost" in inventory due to a lost or damaged RFID tag. As illustrated in FIG. 8A, RFID reader 850 reads the RFID tags 811-819 of item A 801, item B 803, item C 805, item D 807, and item E 809, respectively. According to one embodiment, RFID reader 850 sequentially reads the RFID tags 811-819 from item A 801 to item E 809. Alternatively, the RFID tags 811-819 of items A-E 801-809 are scanned and stored simultaneously, and information regarding the geographic relationship between items A-E 801-809 is recorded. In either case, a supply chain management system may be aware of where any one of items A-E 801-809 is relative to the other items 801-809. For example, a supply chain management system may record that item C 805 is between items B 803 and D 807.

FIG. 8B illustrates an example in which the RFID tag 815 of item C is damaged or lost. As illustrated, an inventory database may indicate that item C 805 is currently available, but item C cannot be found by an inventory scan because its RFID tag 815 is gone. However, as described above, historical inventory data may indicate that the last available scan of item C 805 indicated that it was located between items B 803 and D 807. An inventory scan of all items may reveal the relative location of the "lost" item and a new RFID tag may be affixed, as described in conjunction with FIG. 7.

The above description provides numerous specific details for a thorough understanding of the embodiments described herein. However, those of skill in the art will recognize that one or more of the specific details may be omitted, modified, and/or replaced by a similar process or system.

What is claimed:
1. A supply chain management system comprising:
   a remote sensor configured to receive:
      identification information from a first electronic identification device (EID) associated with an item; and
      identification information from a second EID associated with a person;
   a database in communication with the remote sensor configured to:

associate the identification information received from the first EID with item information related to the item; and associate the identification information received from the second EID with a personal profile of the person;

a processing unit in communication with the remote sensor, the processing unit configured to:

process the identification information received by the remote sensor from the first and second EIDs; and retrieve a portion of the item information related to the item from the database based on the personal profile of the person using the identification information; and an electronic display unit communicatively coupled to the processing unit, the electronic display unit configured to display at least the portion of the item information related to the item via an electronic display.

2. The supply chain management system of claim 1, wherein the remote sensor comprises an RFID reader configured to receive identification information from an RFID tag associated with an item.

3. The supply chain management system of claim 1, wherein the item information related to the item comprises a price.

4. The supply chain management system of claim 1, wherein the item information related to the item comprises information regarding the manufacturing of the item.

5. The supply chain management system of claim 1, wherein the item information related to the item comprises information regarding the shipping of the item.

6. The supply chain management system of claim 1, wherein the item information related to the item comprises information regarding the relative location of the item over time.

7. The supply chain management system of claim 6, wherein the processing unit may be configured to determine a number of times the item has been removed from a location on a retail display.

8. The supply chain management system of claim 1, wherein the portion of the item information displayed by the electronic display unit is further based on the physical location of the item.

9. The supply chain management system of claim 1, wherein the portion of the item information displayed by the electronic display unit is further based on a relative location of the item within a supply chain, wherein relative locations within the supply chain comprise a manufacturing stage, a shipping stage, a storage stage, and a retail sales stage.

10. The supply chain management system of claim 1, wherein the person comprises an employee, wherein the personal profile includes a job description of the employee, and wherein the electronic display unit is configured to display a task to be performed by the employee, the task related to the item.

11. The supply chain management system of claim 1, wherein the person comprises a consumer, and wherein the electronic display unit is configured to display a discount price for the item available to the consumer.

12. The supply chain management system of claim 11, wherein the EID associated with the consumer is embedded in a customer loyalty card.

13. The supply chain management system of claim 1, wherein the remote sensor comprises a portable remote sensor.

14. The supply chain management system of claim 1, wherein the remote sensor is configured to receive identification information from a first plurality of EIDs, each of the first plurality of EIDs associated with an item on a retail display of at least one type of item, wherein the database is further configured to indicate how many of each type of the at least one type of item should be present on the retail display, wherein the processing unit is further configured to determine how many of each type of the at least one type of item is needed to restock the retail display, and wherein the electronic display unit is configured to display how many of each of the at least one type of item is needed to restock the retail display.

15. The supply chain management system of claim 14, wherein the remote sensor is further configured to receive identification information from a second plurality of EIDs, each of the second plurality of EIDs associated with an item for restocking the retail display, wherein the electronic display unit is configured to display how many of each of the at least one type of item is needed to restock the retail display on a first portion of the electronic display, and wherein the electronic display unit is configured to display item information related to each of the items associated with the second plurality of EIDs on a second portion of an electronic display.

16. The supply chain management system of claim 1, wherein the remote sensor is configured to receive identification information from the first EID only when the first EID is within a predefined read-zone.

17. The supply chain management system of claim 16, wherein the predefined read-zone is defined relative to the physical location of the remote sensor.

18. The supply chain management system of claim 16, wherein the predefined read-zone is defined by a set of EIDs, such that the remote sensor ignores identification information from an EID not associated with the set of EIDs.

19. The supply chain management system of claim 1, wherein the item comprises a good to be sold in a retail establishment.

20. The supply chain management system of claim 1, wherein the first EID is associated with a point of purchase (POP) display, wherein the database is configured to associate the identification from the first EID with POP display information, the POP display information comprising identification information of each of a plurality of items associated with the POP display, wherein the processing unit is further configured to determine how many items associated with the POP display are available, and wherein the electronic display unit is configured to display how many items associated with the POP display are available.

21. The supply chain management system of claim 20, wherein the POP display information further comprises timeline information for when the POP display should be on display and when it should be removed from display, and wherein the electronic display unit is further configured to display when the POP display should be on display and when it should be removed from display.

22. A method for managing a supply chain comprising:

receiving identification information, by a remote sensor, from a first electronic identification device (EID) associated with an item;

receiving identification information from a second EID associated with a person;

associating the identification information received from the first EID with item information related to the item within a database in communication with the remote sensor;

associating the identification information received from the second EID with a personal profile of the person;

processing, via a processing unit, the identification information received from the first and second EIDs;

retrieving, via the processing unit, a select portion of the item information from the database based on the personal profile of the person; and displaying, via an electronic display unit, the select portion of the item information related to the item via an electronic display.

23. The method for managing a supply chain of claim 22, wherein the remote sensor comprises an RFID reader configured to receive identification information from an RFID tag associated with an item.

24. The method for managing a supply chain of claim 22, wherein the item information related to the item comprises a price.

25. The method for managing a supply chain of claim 22, wherein the item information related to the item comprises information regarding the manufacturing of the item.

26. The method for managing a supply chain of claim 22, wherein the item information related to the item comprises information regarding the shipping of the item.

27. The method for managing a supply chain of claim 22, wherein the item information related to the item comprises information regarding the relative location of the item over time.

28. The method for managing a supply chain of claim 27, further comprising the processing unit determining a number of times the item has been removed from a location on a retail display using the item information comprising the relative location of the item over time.

29. The method for managing a supply chain of claim 22, wherein the select portion of the item information retrieved is further based on a relative location of the item within a supply chain, wherein relative locations within the supply chain comprises a manufacturing stage, a shipping stage, a storage stage, and a retail sales stage.

30. The method for managing a supply chain of claim 22, wherein the person comprises an employee,
- wherein the personal profile includes a job description of the employee, and
- wherein the select portion of the item information comprises a task to be performed by the employee, the task related to the item.

31. The method for managing a supply chain of claim 22, wherein the person comprises a consumer, and
- wherein the select portion of the item information comprises a discount price for the item available to the consumer.

32. The method for managing a supply chain of claim 31, wherein the EID associated with the consumer is embedded in a customer loyalty card.

33. The method for managing a supply chain of claim 22, wherein the remote sensor comprises a portable remote sensor.

34. The method for managing a supply chain of claim 22, further comprising:
- receiving, via the remote sensor, identification information from a first plurality of EIDs, each of the first plurality of EIDs associated with an item on a retail display of at least one type of item;
- retrieving from a database how many of each type of the at least one type of item should be present on the retail display; and
- displaying, via the electronic display unit, how many of each type of the at least one type of item is needed to restock the retail display.

35. The method for managing a supply chain of claim 34, further comprising:
- receiving, via the remote sensor, identification information from a second plurality of EIDs, each of the second plurality of EIDs associated with an item for restocking the retail display;
- displaying, via the electronic display unit, how many of each type of the at least one type of item is needed to restock the retail display on a first portion of the electronic display; and
- displaying, via the electronic display unit, item information related to each of the items associated with the second plurality of EIDs on a second portion of the electronic display.

36. The method for managing a supply chain of claim 22, wherein the remote sensor is configured to receive identification information from the EID only when the EID is within a predefined read-zone.

37. The method for managing a supply chain of claim 36, wherein the predefined read-zone is defined relative to the physical location of the remote sensor.

38. The method for managing a supply chain of claim 36, wherein the predefined read-zone is defined by a set of EIDs, such that the remote sensor ignores identification information from an EID not associated with the set of EIDs.

39. The method for managing a supply chain of claim 22, wherein the item comprises a good to be sold in a retail establishment.

40. The method for managing a supply chain of claim 22,
- wherein the EID is associated with a point of purchase (POP) display;
- associating the identification from the EID with POP display information, the POP display information comprising identification information of each of a plurality of items associated with the POP display;
- determining how many items associated with the POP display are available; and
- displaying, via the electronic display unit, how many items associated with the POP display are available.

41. The method for managing a supply chain of claim 40, wherein the POP display information further comprises timeline information for when the POP display should be on display and when it should be removed from display, and
- further comprising displaying, via the electronic display unit, when the POP display should be on display and when it should be removed from display.

42. A method for re-associating items in a database to facilitate supply chain management, comprising:
- assigning an original electronic identification device (EID) selected from a finite set of EIDs to each of a plurality of items, wherein each EID is configured to communicate unique identification information to a remote sensor;
- associating the identification information of each of the original EIDs with item information related to each of the plurality of items within a database, such that each item is associated with item information within the database via a unique EID;
- receiving an input indicating that one of the plurality of items no longer has an original, affixed, functional EID;

receiving, via a remote sensor, identification information from each of the original EIDs affixed to each of the plurality of items that has an original, affixed, functional EID;

identifying, via a processing unit, a missing EID, the missing EID identified based on from which of the original EIDs of the finite set of EIDs the remote sensor did not receive identification information;

assigning a new EID to the item that no longer has an original, affixed, functional EID; and associating, within the database, the identification information of the new EID with the item information associated with the identification information of the missing EID, so as to preserve the association of the item information with the item via the new EID.

43. The method of claim 42, wherein the remote sensor comprises an RFID reader configured to receive identification information from an RFID tag associated with an item.

44. The method of claim 42, wherein the item information related to the item comprises a price.

45. The method of claim 42, wherein the item information related to the item comprises information regarding the manufacturing of the item.

46. The method of claim 42, wherein the item information related to the item comprises information regarding the shipping of the item.

47. The method of claim 42, wherein the item information related to the item comprises information regarding the relative location of the item over time.

48. The method of claim 42, wherein the remote sensor comprises a portable remote sensor.

49. The method of claim 42, wherein the item comprises a good to be sold in a retail establishment.

* * * * *